United States Patent [19]

Bonnke et al.

[11] Patent Number: 4,670,499

[45] Date of Patent: Jun. 2, 1987

[54] POLYOLEFIN MOLDING COMPOSITION

[75] Inventors: Martin Bonnke, Hattersheim am Main; Lothar Bothe, Mainz, both of Fed. Rep. of Germany

[73] Assignee: Hoechst Aktiengesellschaft, Fed. Rep. of Germany

[21] Appl. No.: 897,392

[22] Filed: Aug. 15, 1986

[30] Foreign Application Priority Data

Aug. 19, 1985 [DE] Fed. Rep. of Germany ....... 3529651

[51] Int. Cl.$^4$ ................................................ C08K 3/26
[52] U.S. Cl. ................................... 524/427; 106/14.44
[58] Field of Search ....................... 524/427; 106/14.44

[56] References Cited

U.S. PATENT DOCUMENTS

| | | | |
|---|---|---|---|
| 3,137,672 | 6/1964 | Lehane, Jr. | 524/427 |
| 4,211,690 | 7/1980 | Asano et al. | 524/427 |
| 4,407,986 | 10/1983 | Nomura et al. | 524/427 |
| 4,423,164 | 12/1983 | Bar | 524/427 |

FOREIGN PATENT DOCUMENTS

| | | | |
|---|---|---|---|
| 1028332 | 4/1958 | Fed. Rep. of Germany . | |
| 49-27537 | 3/1974 | Japan | 524/427 |
| 55-120642 | 9/1980 | Japan | 524/427 |
| 55-147537 | 11/1980 | Japan | 524/427 |
| 56-161472 | 12/1981 | Japan | 524/427 |
| 58-219245 | 12/1983 | Japan | 524/427 |
| 60-212441 | 10/1985 | Japan | 524/427 |
| 61-21161 | 1/1986 | Japan | 524/427 |

Primary Examiner—Joseph L. Schofer
Assistant Examiner—N. Sarofim
Attorney, Agent, or Firm—Connolly and Hutz

[57] ABSTRACT

A polyolefin molding composition which contains a very small amount of a specific calcium carbonate causes only very little corrosion on machines during processing.

3 Claims, No Drawings

POLYOLEFIN MOLDING COMPOSITION

The invention relates to a polyolefin molding composition which, in processing, causes less corrosion on the processing machines.

The processing of polyolefin molding compositions into moldings frequently gives rise to corrosion on the metal parts which come into contact with the hot molding composition. There has therefore been no shortage of attempts to overcome this defect.

It is known to add to such molding compositions additives such as calcium stearate or tripotassium citrate or hydrotalcite for reducing the corrosion on the processing machines. However, processing can give rise to undesirable deposits on the machine parts and/or the appearance of vapors, which leads to difficulties in production, while in other cases the color quality of the moldings is impaired (yellowing).

It is further known to add small amounts of different additives to low pressure polyethylene in order to remove the negative effects of catalyst residues (cf. German Auslegeschrift No. 1,028,332). The many other substances mentioned also include calcium carbonate, but calcium stearate is supposed to be most effective. However, it has been found that in the present case even calcium stearate is not effective enough.

It has now been found that a polyolefin molding composition which contains a very small amount of a specific calcium carbonate, on processing on machines, causes less corrosion on the machines and that no deposits form or evaporations occur, while the color quality of the moldings prepared is at the same time good.

The invention thus relates to a polyolefin molding composition comprising a homopolymer or copolymer of a 1-olefin having 2 to 10 carbon atoms, 0.01 to 0.2% by weight, based on the polyolefin, of a calcium carbonate which has a particle size of less than 10 $\mu$m, an average particle size of less than 0.1 $\mu$m, a specific surface area greater than 40 $m^2/g$ and a whiteness greater than 90%, and also where appropriate customary other auxiliaries or additives in customary amounts.

The polyolefin molding composition according to the invention can be based on homopolymers or copolymers of 1olefins having 2 to 10 carbon atoms, for example of ethylene, propylene, but-1-ene, 4-methylpent-1-ene. Possibilities are thus polyethylene, polypropylene, polybut-1-ene, poly(1-methylpent-1-ene), ethylene/propylene copolymers, ethylene/butene copolymers and the like and of mixtures of these polymers. The use of polypropylene is preferred.

The calcium carbonate used in the molding composition must have very specific properties. The particle size of the calcium carbonate should be as fine as possible. The particles should be smaller than 10 $\mu$m, preferably smaller than 7 $\mu$m, the average particle diameter being less than 0.1 $\mu$m, preferably less than 0.05 $\mu$m. The specific surface area of the calcium carbonate should be above 40 $m^2/g$, preferably above 80 $m^2/g$. The whiteness should be more than 90%, preferably more than 95%. The calcium carbonate is used in an amount of 0.01 to 0.2, preferably 0.03 to 0.1, % by weight, based on the polyolefin.

The molding composition according to the invention can contain the customary additives which facilitate processing and improve the physical properties. Examples thereof are: light and heat stabilizers, antioxidants, antistatics, lubricants, nucleants, antiblocking agents and also fillers, colored pigments, synthetic and natural resins and flame retarders. The first group is generally present in the molding composition in an amount of 0.01 to 5% by weight, calculated on the amount of polymer (+filler). Fillers, colored pigments, synthetic and natural resins and flame retarders are used in an amount which corresponds to existing requirements.

The calcium carbonate is incorporated in the polyolefin in a known manner, for example by means of mixers, extruders, rolls or kneaders, and a masterbatch of the calcium carbonate can also be used in the incorporation.

EXAMPLES

A propylene polymer (melt index 5/230 = 14 g/10 min; n-heptane-insolubles 96% by weight) was finished with increasing amounts of calcium carbonate and then subjected to a corrosion test in each case. The yellowness of the corresponding molding composition was also determined.

In comparative experiments the polypropylene was finished with corresponding amounts of calcium stearate, tripotassium citrate and hydrotalcite.

In all experiments, 0.1% by weight of pentaerythritol tetrakis-(3 (3,5-di-t-butyl-4-hydroxyphenyl)-propionate) was used for stabilizing the polypropylene.

To determine the corrosion value of the materials, in each case 2 iron wafers 0.2 mm in thickness were placed into the molding composition samples in such a way that they were evenly surrounded by the molding composition. To this end, the hole ($\phi$ 50 mm) in a 4 mm spacer frame was filled with about half the weighed-out amounts of material (6 g), and the wafers were placed side by side by means of forceps so that they did not touch each other or the frame. The iron wafers were about 20 mm in length and were stored in acetone after they had been degreased by rubbing off in acetone. Before being placed in the molding composition they had to be freed from acetone by means of soft tissue. The iron wafers must not be touched by the fingers.

Spacer frame and cover sheets (aluminum foils) were placed into a hot press and after 5 min of contact pressure at 250° C. were compressed under a pressure of 100 atm for 1 h. Beforehand, the 0.5 mm-thick aluminum foil which had been inserted between top plate and spacer frame was rubbed with vaseline in order to reduce the adhesion of the product to the aluminum foil. The press was then immediately cooled down. The iron wafers must still lie side by side and must not project out of the sheet. They were stamped out of the sheet, hole-punched and weighed to an accuracy of 1/10 mg. Of course they could not be touched by hand. They were then suspended in a row on a copper wire in the steam flow of boiling water. A sieve was positioned above the water surface in order to prevent water droplets from depositing on the wafers. After 1 h the iron wafers were removed, stored at room temperature for 1 h and then weighed again. The weight increase in percent gives the corrosion value.

The color quality of the molding compositions was determined by means of yellowness measurement in accordance with DIN 6174 (Cielab system) and DIN 6167 ASTM D 1925 (standard yellowness).

The appearance of deposits or evaporations was judged during the processing of the molding compositions on an extrusion unit.

Active components used

EXAMPLE 1

Calcium carbonate 1

Maximum particle diameter: 10 μm
Average particle diameter: 0.05 μm
Specific surface area: 46 m$^2$/g
Whiteness: 97%

EXAMPLE 2

Calcium carbonate 2

Maximum particle diameter: 6 μm
Average particle diameter: 0.02 μm
Specific surface area: 105 m$^2$/g
Whiteness: 96%

COMPARATIVE EXAMPLE A

Calcium stearate

COMPARATIVE EXAMPLE B

Tripotassium citrate

COMPARATIVE EXAMPLE C

Hydrotalcite DHT-4A

Supplier: Kyowa Chemical Industry (Japan).

Table of investigation results

| Polypropylene + active component | Corrosion value | | | | | Yellowness | | | | | Deposits/evaporations | | | | |
|---|---|---|---|---|---|---|---|---|---|---|---|---|---|---|---|
| | Examples | | Comparative Examples | | | Examples | | Comparative Examples | | | Examples | | Comparative Examples | | |
| | 1 | 2 | A | B | C | 1 | 2 | A | B | C | 1 | 2 | A | B | C |
| PP + 0.04% | 0.14 | 0.11 | 0.45 | 0.03 | 0.4 | 13 | 12.9 | 12.9 | 13 | 16 | ++ | ++ | − | − | ++ |
| PP + 0.08% | 0.10 | 0.09 | 0.40 | 0.02 | 0.25 | 13.7 | 13.7 | 13.9 | 14.2 | 18.1 | ++ | ++ | − | − | ++ |
| PP + 0.15% | 0.09 | 0.07 | 0.15 | 0.02 | 0.19 | 14.4 | 14.2 | 14.5 | 14.8 | 20.5 | ++ | ++ | − | − | ++ |

Deposits/evaporations during processing:
++ = no problems due to deposits/evaporations
− = troublesome deposits and evaporations which necessitate production stoppages for cleaning purposes

We claim:
1. A polyolefin molding composition comprising a homopolymer or copolymer of a 1-olefin having 2 to 10 carbon atoms, 0.01 to 0.2% by weight, based on the polyolefin, of a calcium carbonate which has a particle size less than 10 μm, an average particle size of less than 0.1 μm, a specific surface area greater than 40 m$^2$/g and a whiteness greater than 90%.

2. The polyolefin molding composition as claimed in claim 1, wherein the 1-olefin polymer is polypropylene, polyethylene or an ethylene/propylene copolymer.

3. A process for reducing corrosion on machines in the processing of homopolymers or copolymers of a 1-olefin having 2 to 10 carbon atoms by addition of calcium carbonate, which comprises admixing to the polymers 0.01 to 0.2% by weight, based on the polyolefin, of a calcium carbonate which has a particle size less than 10 μm, an average particle size less than 0.1 μm, a specific surface area greater than 40 m$^2$/g and a whiteness greater than 90%.

* * * * *